(12) United States Patent
Ko et al.

(10) Patent No.: US 6,438,193 B1
(45) Date of Patent: Aug. 20, 2002

(54) SELF-POWERED TIRE REVOLUTION COUNTER

(76) Inventors: Wen H. Ko, 1356 Forest Hills Blvd., Cleveland Heights, OH (US) 44118; Huijun Xie, 35 Yorkshire Ter. #10, Shrewsbury, MA (US) 01545

( * ) Notice: Subject to any disclaimer, the term of this patent is extended or adjusted under 35 U.S.C. 154(b) by 0 days.

(21) Appl. No.: 09/743,617
(22) PCT Filed: Jul. 9, 1999
(86) PCT No.: PCT/US99/15631
§ 371 (c)(1), (2), (4) Date: Jan. 10, 2001
(87) PCT Pub. No.: WO00/02741
PCT Pub. Date: Jan. 20, 2000

Related U.S. Application Data
(60) Provisional application No. 60/092,270, filed on Jul. 10, 1998.

(51) Int. Cl.[7] .............................................. G01C 21/00
(52) U.S. Cl. ........................... 377/24.1; 377/15; 377/16
(58) Field of Search ............................. 377/15, 16, 24.1

(56) References Cited

U.S. PATENT DOCUMENTS

| | | | |
|---|---|---|---|
| 3,456,134 A | 7/1969 | Ko | 310/8.5 |
| 3,553,060 A | 1/1971 | Waltz | 156/516 |
| 3,573,611 A | 4/1971 | Bergemann et al. | 324/57 |
| 3,613,075 A | 10/1971 | Griffiths et al. | 340/58 |
| 3,691,524 A | 9/1972 | Frost et al. | 340/58 |
| 3,810,172 A | 5/1974 | Burpee et al. | 343/5 |
| 4,220,907 A | 9/1980 | Pappas et al. | 322/3 |
| 4,237,728 A | 12/1980 | Betts et al. | 73/146.5 |
| 4,504,761 A | 3/1985 | Triplett | 310/800 |
| 4,510,484 A | 4/1985 | Snyder | 340/58 |
| 4,862,486 A | 8/1989 | Wing et al. | 377/16 |
| 5,339,073 A | 8/1994 | Dodd et al. | 340/825.31 |
| 5,524,034 A | 6/1996 | Srygley et al. | 377/15 |
| 5,541,574 A | 7/1996 | Lowe et al. | 340/447 |
| 5,546,070 A | 8/1996 | Ellmann et al. | 340/442 |
| 5,573,611 A | 11/1996 | Koch et al. | 152/152.1 |
| 5,581,023 A | 12/1996 | Handfield et al. | 73/146.5 |
| 5,774,047 A | 6/1998 | Hensel, IV | 340/442 |
| 6,293,632 B1 * | 9/2001 | Grote et al. | 303/112 |

FOREIGN PATENT DOCUMENTS

GB  2307044  5/1997

OTHER PUBLICATIONS

"Piezoelectric Powered (Batteryless) Radio Frequency Identification Tag for Tires" IBM Technical Disclosure Bulletin, vol. 39, No. 8, Aug. 1, 1996, pp. 245–246 XP000638201 ISSN: 0018–8689.

* cited by examiner

*Primary Examiner*—Margaret R. Wambach
(74) *Attorney, Agent, or Firm*—Howard M. Cohn

(57) ABSTRACT

The rotation of a pneumatic tire is monitored by a self powered tire revolution counter. A piezoelectric ("piezol") element is mounted in the tire in a manner so as to be subjected to periodic mechanical stresses as the tire rotates and to provide periodic pulses in response thereto. The output of the piezo element is utilized by revolution counting circuitry to count rotations of the tire, as well as by power circuitry to power the revolution counting circuitry.

6 Claims, 7 Drawing Sheets

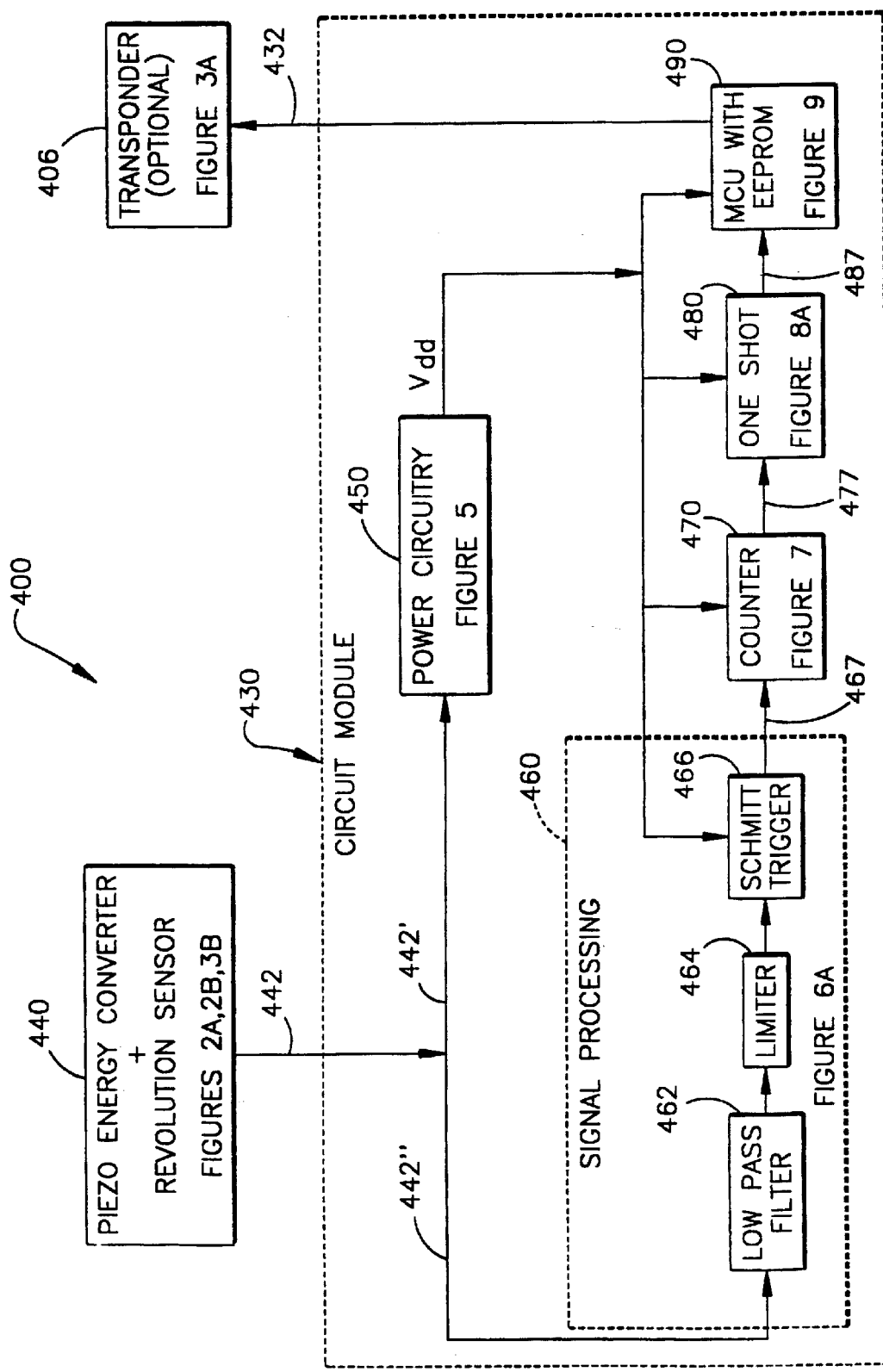

… …

SELF-POWERED TIRE REVOLUTION COUNTER

CROSS-REFERENCE TO RELATED APPLICATIONS

This application is a continuation-in-part of commonly-owned, copending U.S. Provisional Pat. App. Ser. No. 60/092,270, filed Jul. 10, 1998 by Ko, et al.

TECHNICAL FIELD OF THE INVENTION

The invention relates to monitoring rotation of a pneumatic tire, with Telemetry apparatus disposed in the tire.

BACKGROUND OF THE INVENTION

MONITORING TIRE CONDITIONS

It is known to remotely monitor conditions of pneumatic tires of motor vehicles. For example, telemetry devices comprising an RF transmitter and one or more condition sensors may be disposed in each of the tires. A transponder and associated conditions sensors (e.g., pressure, temperature) may also be disposed in pneumatic tires of motor vehicles. A "transponder" is an electronic device capable of both receiving and transmitting radio frequency (RF) signals. These transponders transmit a RF wave, with or without variable data (e.g., pressure, temperature) and/or fixed data (e.g., tire ID) to outside the tire, and receive RF signals, with or without data, from outside the tire. A separate transponder is typically associated with each tire of a motor vehicle to monitor and transmit tire-related data. Typically, a single "interrogator" having both transmitting and receiving capabilities is used to communicate with the plurality of transponders. The interrogator may be "hand-held", or mounted "on-board" the vehicle, or positioned along or in a roadway (e.g., "drive-over", or "drive by").

"Active" transponders have their own power supply (e.g., a battery). They transmit signals, and are typically also capable of receiving signals to control their functionality.

"Passive" transponders are powered by the energy of an incoming RF signal, such as from an interrogator. Passive transponders fall into two general categories, those having only passive circuitry, and those having some active circuitry. In the main, transponders which are passive transponders having some active circuitry are discussed herein.

Transponder systems including a plurality of transponders and a single interrogator are well known and disclosed, for example, in U.S. Pat. No. 5,339,073 (Dodd, et al.; 1994), incorporated in its entirety by reference herein, which shows that both the interrogator and the individual transponders may comprise microprocessors. An example of a device for monitoring, storing and telemetering information such as temperature, pressure, tire rotations and/or other operating conditions of a pneumatic tire, along with tire identification information, can be found in U.S. Pat. No. 5,573,611 (Koch, et al.; 1996), incorporated in its entirety by reference herein.

FIG. 1A illustrates a typical tire pressure monitoring system 100 of the prior art installed on a motor vehicle 102 (shown in dashed lines) having four pneumatic tires 104a . . . 104d installed on four respective wheels (not shown). A transponder ("TAG") 106a . . . 106d is disposed within each of the tires 104a . . . 104d, respectively. The transponders 106a . . . 106d are preferably passive transponders which obtain their operating power from an RF signal such as is typically generated by an on-board interrogator 108 which is mounted within the vehicle. A sensor (not shown), such as a pressure sensor or a temperature sensor, is typically associated with each transponder 106a . . . 106d.

The interrogator 108 comprises an RF transmitter 112 (e.g., for powering passive transponders), an RF receiver 114, control logic 116 which may include a microprocessor ($\mu$P), and a display device 118 such a visual display and optionally including an audible alarm. Antennas ("ANT") 110a . . . 110d are disposed on the vehicle 102, preferably adjacent the tires 104a . . . 104d, respectively, such as in the wheel wells of the vehicle. The antennas 110a . . . 110d are suitably ferrite loopstick antennas.

The use of multiple vehicle antennas 110a . . . 110d, each at a fixed position on the vehicle adjacent a respective tire 104a . . . 104d is well known and preferred, and is disclosed in U.S. Pat. Nos. 3,553,060; 3,810,090; 4,220,907; 5,541,574; and 5,774,047, all of which are incorporated in their entirety by reference herein.

In use, the interrogator 108 powers the transponders 106a . . . 106d which, in turn, transmit data indicative of a measured condition (e.g., air pressure) back to the interrogator. In any such system, it is desirable to have efficient and effective coupling of signals between the fixed antennas 110a . . . 110d (alternatively, one centrally-located fixed antenna) and the moving (i.e., when the vehicle is in motion) transponders (each of which has its own antenna, not shown).

FIG. 1B illustrates, generally, the physical arrangement of a transponder 106 (representative of any one of the transponders 106a . . . 106d) disposed within a pneumatic tire 104 (representative of any one of the tires 104a . . . 104d). The transponder 106 is mounted in any suitable manner to an inner surface 105 of the tire 104. An antenna 110 (representative of any one of the antennas 110a . . . 110d) is disposed on the vehicle near the tire 104 such as in a wheel well, to provide electromagnetic radiation to power the transponder 106 (in the case of a passive transponder), as well as to receive signals from the transponder 106.

REVOLUTION COUNTERS

In many industries there exists a need for a device capable of automatically counting revolutions of a rotating element, storing a data count, and transferring the data to a computing device for manipulation. The degree of accuracy (or resolution, required varies from a count of complete revolutions or rotations (low resolution) to a measurement of partial revolutions in very small increments (high resolution). Monitoring revolutions of vehicle tires is of particular interest with regard to the present invention.

U.S. Pat. No. 3,613,075 (Griffiths; 1971), incorporated In its entirety by reference herein, discloses monitoring tire inflation by sensing the angular movement of a wheel by counting revolutions of the wheel and comparing the count with a count from another wheel or a reference to determine whether or not the wheel has the proper diameter (hence, proper inflation). For counting revolutions of a wheel, a block of metal is mounted for rotation on the brake drum of the wheel and projects radially outwardly to pass in close proximity to a pickup which may be a normally open switch which is held closed by the attraction of a permanent magnet forming a part of the switch mechanism. Counting circuits are disclosed in this patent. See also U.S. Pat. No. 3,691,524 (Frost, et al. 1972).

U.S. Pat. No. 5,524,034 (Srygley, et al.; 1996), incorporated in its entirety by reference herein, discloses an automatic revolution counting and data transmission device in the form of a hub-odometer for measuring rotations of a wheel on a vehicle. The use of reed switches (9) and a magnet (14) for detecting rotation is described. The switches provide signals which relate directly to the revolution of the hub unit. These signals are processed into a suitable machine-readable format for use by a microcontroller (7) As noted in the patent (column 3, lines 28–30), "the signal must be lengthened, de-bounced, and output at the correct signal level. The signal conditioner (8) takes care of this task." The possibility of using optical sensors, gear tooth sensors, Hall effect devices, and contact sensors in lieu of the reed switches and magnets for sensing rotation is disclosed.

U.S. Pat. No. 4,862,486 (Wing, et al.; 1989), incorporated in its entirety by reference herein, discloses a revolution counter that is attached to the vehicle tire. As aptly noted in this patent, a problem with mechanical counters attached to the axle or wheel hub is that by not being mounted to the tire itself, the counter must be changed or separate records must be maintained whenever the tire is changed to maintain a proper count for a given tire. This patent describes revolution-counting apparatus comprising a piezoelectric polymer sensor (5) which senses a change in stress as a given section of a tire is stressed with each revolution. The output of the sensor (5) is conditioned by a Schmidt trigger (15) or other suitable circuit which is effective in shaping and amplifying the electrical pulse from the sensor so that it is suitable as an input to the counter (13). The counter circuit is preferentially powered by a battery (9), and it is preferred to electronically download the information of the counter at such time as tire failure has occurred (see column 2, lines 5–35).

Piezoelectric ("Piezo") elements

Piezoelectricity, literally "pressure electricity" is a property of certain materials such as quartz, Rochelle salt, and certain solid-solution ceramic materials such as lead zirconate-titanate (Pb(Zrl-xTix)03) ("PZT"). In a "generator" mode, electricity is developed when a piezoelectric ("piezo") crystal is mechanically stressed. Conversely, in a "motor" mode, the piezo crystal reacts mechanically when an electric field is applied. Applications for piezo crystals include force transducers, spark pumps for cigarette lighters and boiler ignition, microphone heads, stereophonic pick-ups, etc.

PZT is one of the leading piezoelectric materials used today. It can be fabricated in bimorph or unimorph structures (piezo elements), and operated in flexure mode. These structures have the ability to generate high electrical output from a source of low mechanical impedance (conversely, to develop large displacement at low levels of electrical excitation).

U.S. Pat. No. 3,456,134 (Ko; 1969), incorporated in its entirety by reference herein, discloses a piezoelectric energy converter for electronic implants, wherein body motion is converted into electrical energy using a piece of piezoelectric PZT in the form of a resonant cantilever beam. The piezoelectric beam is enclosed in a small case whose free end is loaded with a weight to resonate at a suitable frequency corresponding to the movement that drives the enclosing case. As the base of the case is moved periodically, the PZT wafer vibrates at its natural frequency. The electrical pulse is generated by the vibration and then is rectified by a voltage doubler to store in a capacitor. The converted electrical energy is used to supply the implant device or pacemaker. When the PZT converter is implanted on the surface of a dog's heart, the electrical output is estimated to have generated 4.0 volts at 105 ohms, or 160 microwatts.

U.S. Pat. No. 4,510,484 (Snyder; 1985), incorporated in its entirety by reference herein, discloses a piezoelectric reed power supply for use in abnormal tire condition warning systems. A device is provided for sensing a tire condition, and is mounted on a tire rim so as to be subject to vibrations normally occurring as a result of operating the vehicle. The power supply includes a piezoelectric reed having a base portion and an end portion. A tuning mass member is mounted to the end portion. The tuning mass is sized relative to the piezoelectric reed to obtain a resonant frequency of vibration of the power supply induced by common road vibrations during wheel operation. Various mechanisms for limiting flexure of the piezoelectric reed and inhibiting compound bending of the reed are disclosed.

U.S. Pat. No. 4,504,761 (Triplett; 1985), incorporated in its entirety by reference herein, discloses a vehicular mounted piezoelectric generator, and is incorporated in its entirety by reference herein. A piezoelectric array is mounted on one or more tires of a motor vehicle. As the vehicle drives down the road, the tire is flexed during each revolution to distort the piezoelectric elements and generate electricity. An electric circuit delivers the energy to the electrical system of the vehicle.

Piezo elements are known to be used in conjunction with telemetry systems, such as wheel-mounted telemetry systems for monitoring the conditions of pneumatic vehicle tires.

U.S. Pat. No. 4,237,728 (Betts, et al.; 1979) incorporated in its entirety by reference herein, discloses a low-tire warning system capable of detecting under-inflation of a pneumatic tire when the tire is rotating, and is incorporated in its entirety by reference herein. Each tire has a telemetry unit with a piezoelectric transducer which is adapted to be mounted adjacent a pneumatic tire on a vehicle, and deflected with each revolution of the tire when the tire profile is low. Pulses from the transducer are accumulated on a capacitor to provide a power supply. Upon reaching a threshold charge, a counter commences counting the pulses.

When the counter reaches a predetermined count, it produces an enable signal. An encoder produces an encoded signal. A transmitter for transmitting a modulated radio signal receives the encoded signal for modulating a carrier frequency to produce a modulated radio signal. At least one of the encoder and transmitters are connected to the counter to be enabled by the enable signal.

Attention is also directed to the following, each of which is incorporated in its entirety by reference herein: U.S. Pat. No. 5,260,683 (Tanaka, et al.; 1993; a piezo element is deformed by tire pressure); and U.S. Pat. No. 5,581,023 (Handfield, et al.; 1996; pressure transducer including a piezo-resistive, variably-conductive layer).

PZT Piezo Elements

Many crystals have been found to possess piezoelectric property. Until the late 1940's piezoelectric materials included quartz, Rochelle salt, tourmaline, ammonium dihydrogen phosphate (ADP), and lithium sulfate monohydrate. Not only single crystal, but polycrystalline ceramics solid can present piezoelectricity after subjected to a "poling" field. Since 1957 lead zirconate-titanate (PZT) solid-solution ceramics has become one of the most important piezoelectric materials which offers high piezoelectric coupling, wide operating temperature range, and a choice of useful variations in engineering parameter.

Piezoelectric ceramics are generally made by a solid state reaction of several oxides or carbonates, followed by high temperature firing involving crystal grain growth, and the electric poling process. Most piezoelectric ceramics are solid solutions. Variation of chemical composition allows the optimizing of properties. The leading position of the PZT compositions is due to their intrinsically strong piezoelectric effect and high Curie point, which allow a wide variation in chemical composition to obtain a wide range of operating parameters without serious reduction of the piezoelectric effect. By changing the composition of titanium and zirconium, the properties of the PZT change. There are many types of PZT, including Clevite PZT-2, PZT-4, PZT-5, PZT-6, PZT-7, PZT-8 etc. PZT-2 has rich zirconium composition, exhibiting high coupling property. PZT-4 has some calcium, strontium or barium to replace lead, and tin for zirconium, resulting in lowered Curie point and increased permittivity. The PZT-5 is electron-donor doped lead zirconate-titanate, using a high valence composition to replace the low valence composition, niobium (valence 5) for titanium (valence 4) or lanthanum (valence 3) for lead (valence 2). The resulting PZT-5 has an enhanced permittivity and compliance, increased dc resistivity, and reduced aging rate. PZT-6 shows long time stability, PZT-7 exhibits low permittivity, and PZT-8 shows low dielectric loss at high electric drive.

Applications of piezoelectric materials can generally be divided into two classes: resonant and non-resonant. The present invention is directed principally to non-resonant applications of piezo elements, such as applying mechanical stress thereto by bending the piezo element.

FIG. 2A is a cross-sectional view of a "bimorph" piezo element 200. A "bimorph" is a flexing-type piezoelectric element, which has the capacity for handling larger motions and smaller forces than single piezoelectric plates. The bimorph 200 comprises two planar piezo crystals 204 and 208 secured together face-to-face with a shim or vane 206 therebetween. When a voltage is applied to the electrodes 202 and 210, the two crystals 204 and 208 are caused to deform in opposite directions, one in expanding mode and one in shrinking mode, which result in a bending action. Conversely, mechanical bending of the element 200 will cause it to develop a corresponding voltage between the electrodes 202 and 210. The bimorph 200 may have its two crystals 204 and 210 connected either in series or parallel.

FIG. 2B is a cross-sectional view of a "unimorph" piezo element 220. The unimorph 220 comprises a planar piezoelectric plate 224 (compare 204) bonded to a plate 226 (e.g., a brass plate) and having an electrode 222 (compare 202) on an opposite surface thereof. The operation of the unimorph 220 is essentially the same as that of the bimorph 200, since as the piezo crystal 224 attempts to react to an electrical signal, it is contained at the bonded surface— the net result being deflecting or bending. Conversely, flexing of the unimorph 220 will result in the generation of electrical energy by the piezo crystal 224.

There are a number of design challenges attendant incorporating piezo elements in tires, and implementing tire rotation counting schemes. A piezo element incorporated into a tire must be durable. It should also last a long time, such as 5–10 years. Any circuit being powered by a piezo element rather than a battery or by RF from an interrogator should consume very little power since the power is limited. Revolution data needs to be able to be increased continuously and stored permanently even with an interrupted power source. When required, the data should be able to communicate via wireless RF telemetry to an outside reader.

OBJECTS AND SUMMARY OF THE INVENTION

It is an object of the present invention to provide method and apparatus for monitoring one or more dynamic operating conditions of a rotary element such as a pneumatic motor vehicle tire, as defined in one or more of the appended claims and, as such, having the capability of being implemented in a manner to accomplish one or more of the subsidiary objects.

It is a further object of the invention to count the revolutions of a pneumatic tire utilizing a sensor which responds to the periodic mechanical stresses as the tire rotates under load on a load bearing surface such as a roadway.

It is a further object of the invention that the tire revolution counter is self powered, without requiring a battery or other stored energy device, and also not requiring an external source of power such as radiated RF energy.

It is a further object of the invention that the self powered tire revolution counter be mounted inside of a pneumatic tire and will continually update the total tire revolution count and store the same in a non-volatile storage medium within he tire for the lifetime of the tire.

It is a further object of the invention that the self powered tire revolution counter will make the updated total revolution count available to other reading devices, sensors, controllers and telemetry devices such as transponders which may also be mounted inside of the same pneumatic tire.

According to the invention, a self-powered revolution counter comprises a mechanical-electrical energy converter and a revolution counting circuit. One piezoelectric crystal element (piezo element) acts both as an energy converter and as a revolution sensor. The piezo element transforms mechanical energy into electrical energy and then serves as a power supply to the revolution counting circuit. The revolution counting circuit receives the revolution signals, processes them, increases and stores the new count into a non-volatile memory. The counting circuit can be programmed to convert the revolution count to an approximate mileage total. This self-powered revolution counter includes (1) a piezoelectric mechanical-electrical energy converter/power supply, (2) an analog circuit for signal conditioning and shaping, (3) a digital logic circuit for counting, and (4) a microcontroller with built-in EEPROM for non-volatile data storage.

According to an aspect of the invention, the piezo element as molded into the tire; it is deformed when the tire section with the piezo element contacts ground; and the induced stress generates an electrical pulse and damped oscillations via the piezoelectric effect. The generated pulses are rectified and conditioned to serve as a DC power source, and at the same time they are used as an indicator of tire revolutions. Therefore, one piezoelectric element can be used simultaneously for energy conversion and for counting tire revolutions when the vehicle is moving.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Certain elements in selected ones of the drawings may be illustrated not-to-scale, for illustrative clarity.

Figure 1A:
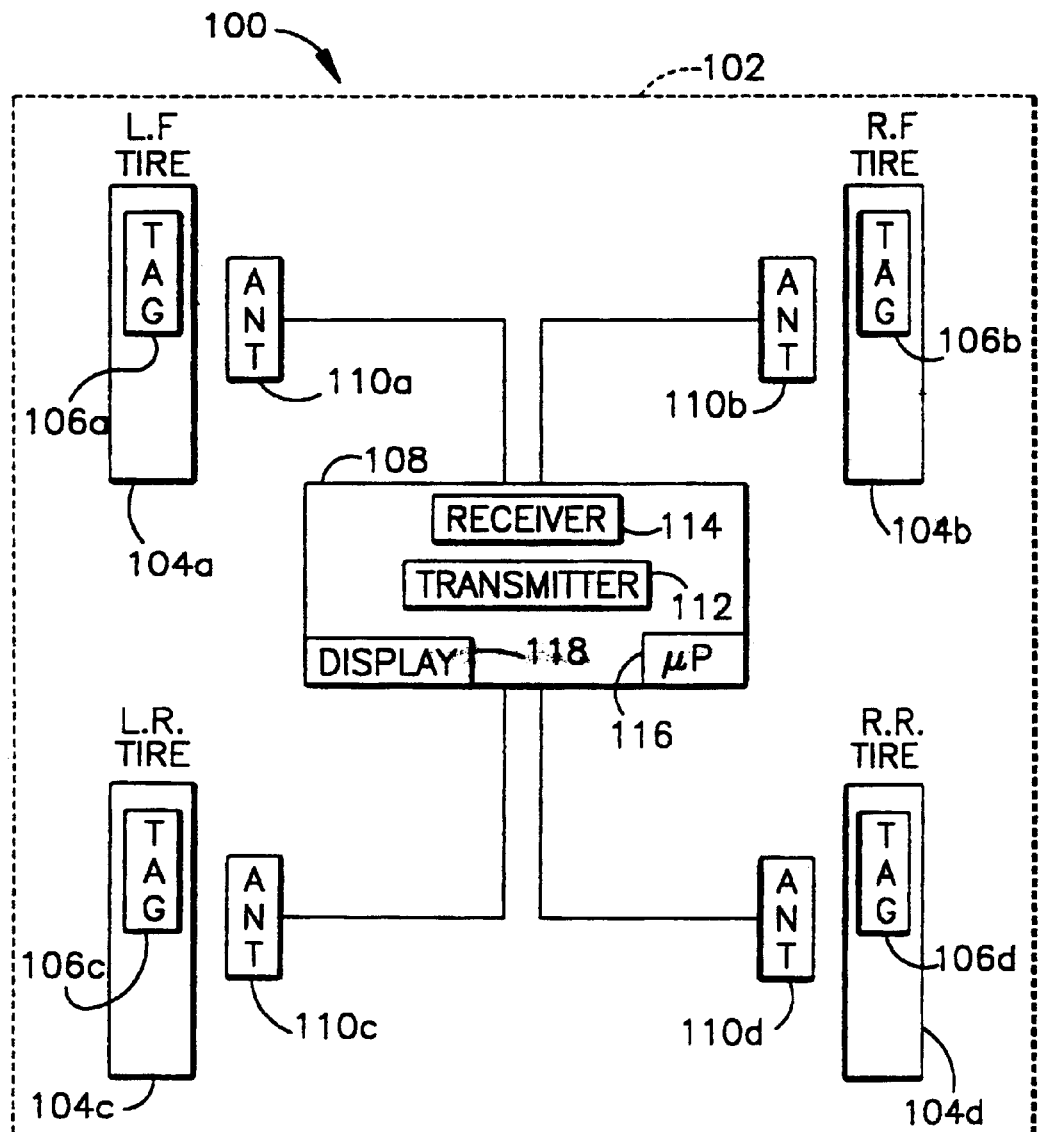

Often, similar elements throughout the drawings may be referred to by similar reference numerals. For example, the element 199 in a figure (or embodiment) may be similar in many respects to the element 299 in an other figure (or embodiment).

Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199a, 199b, 199c, etc.

The cross-sectional views, if any, presented herein may be in the form of "slices", or "near-sighted" cross-sectional views, omitting certain background lines which would otherwise be visible in a true cross-sectional view, for illustrative clarify.

Figure 1B:
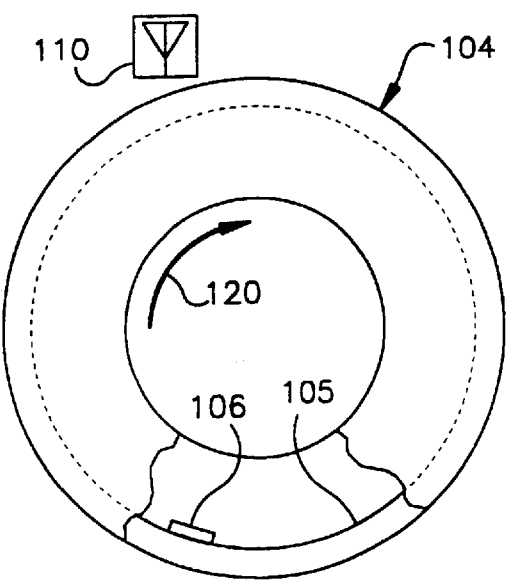
Figure 3A:
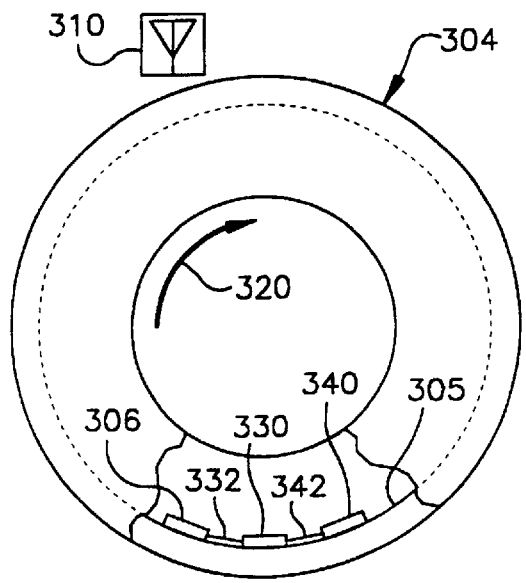
Figure 2A:
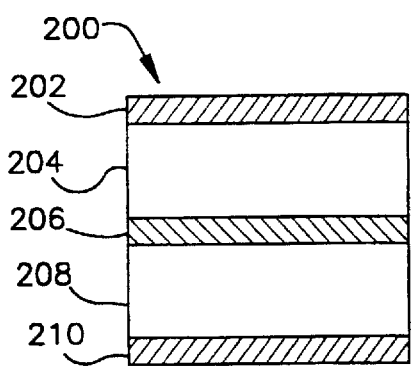
Figure 3B:
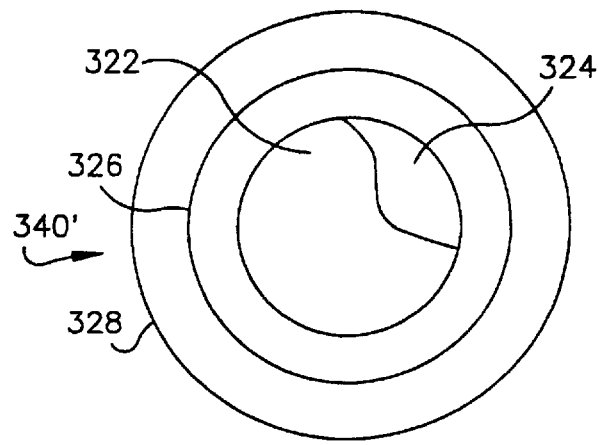
Figure 2B:
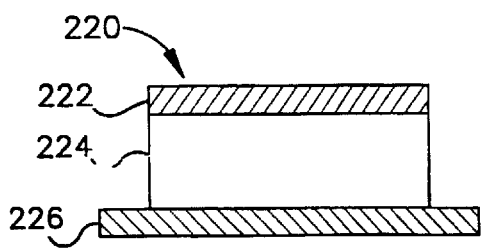
Figure 5:
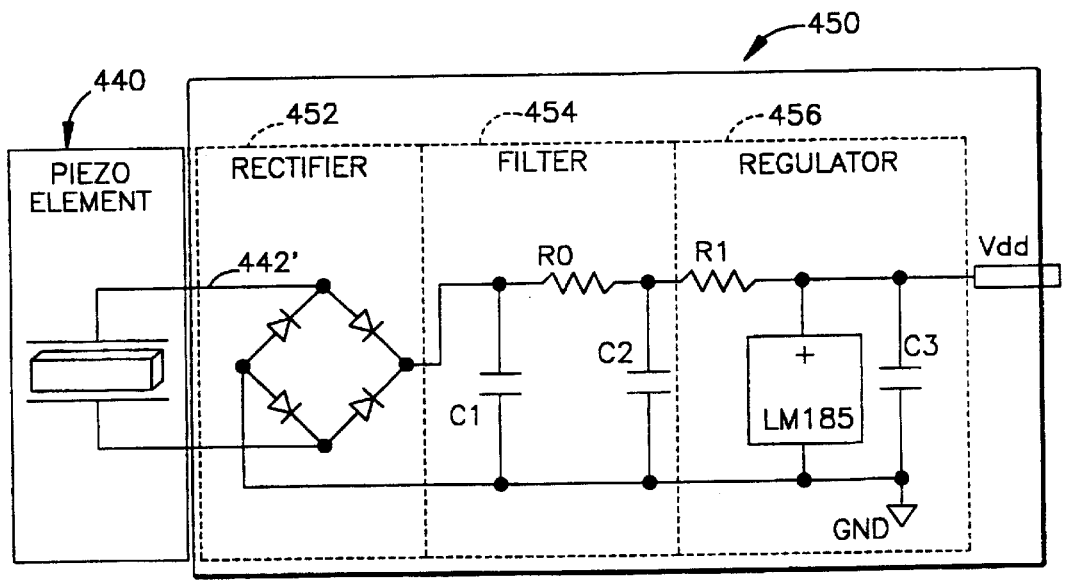
Figure 6A:
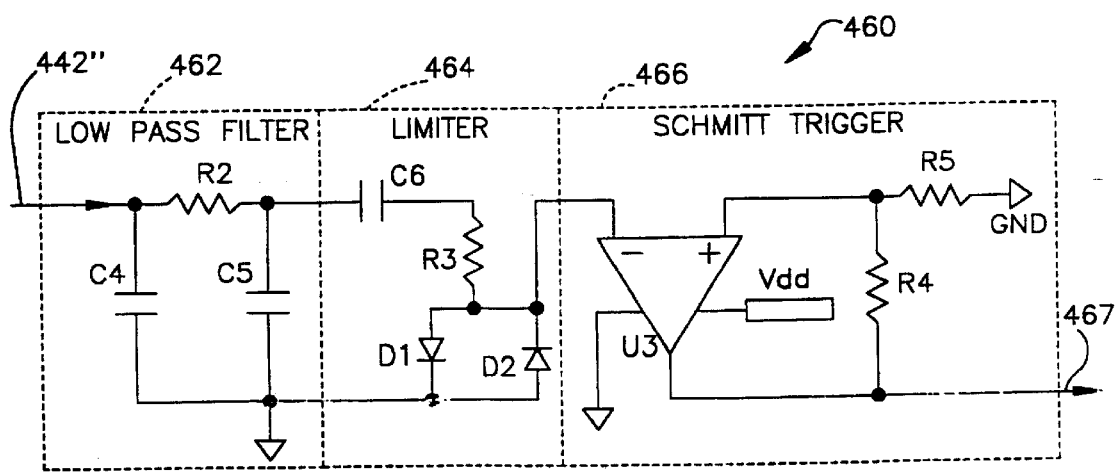
Figure 6B:
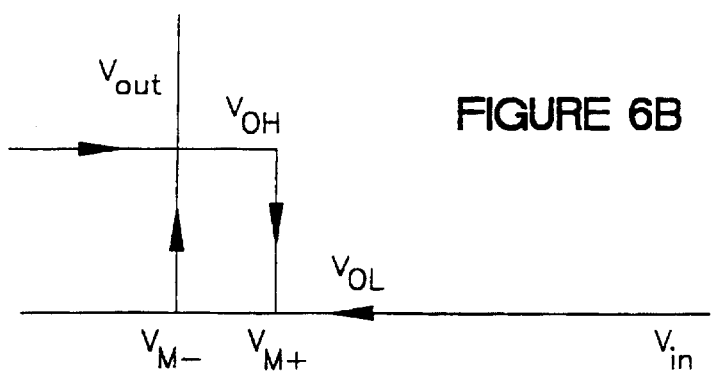
Figure 6C:
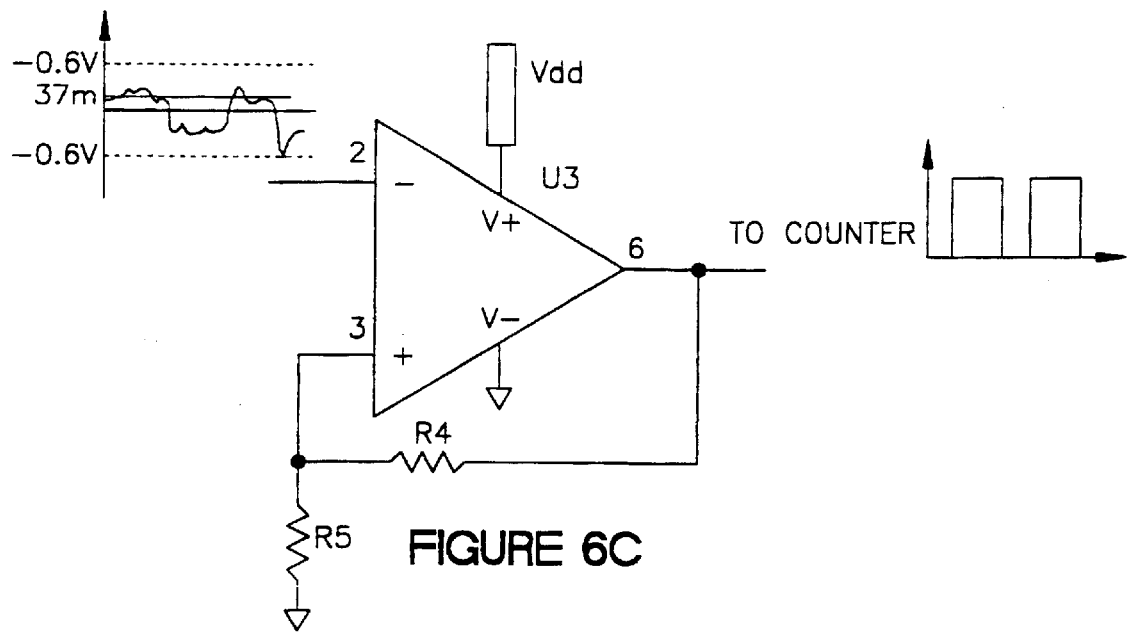
Figure 7:
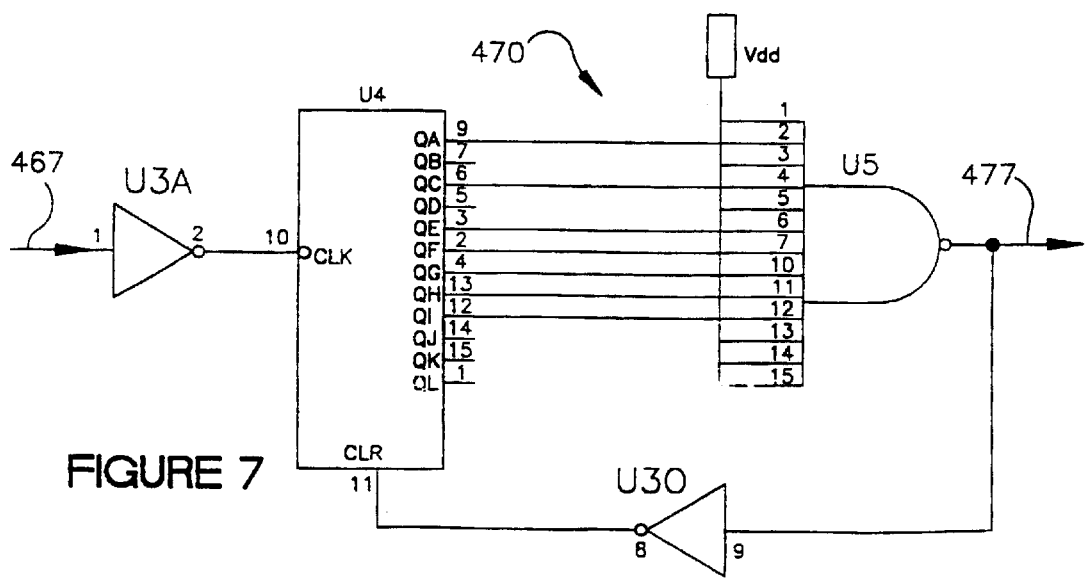
Figure 8A:
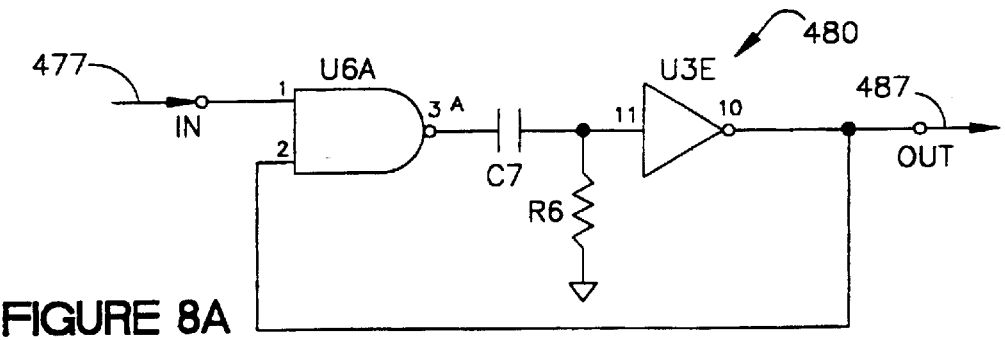
Figure 8B:
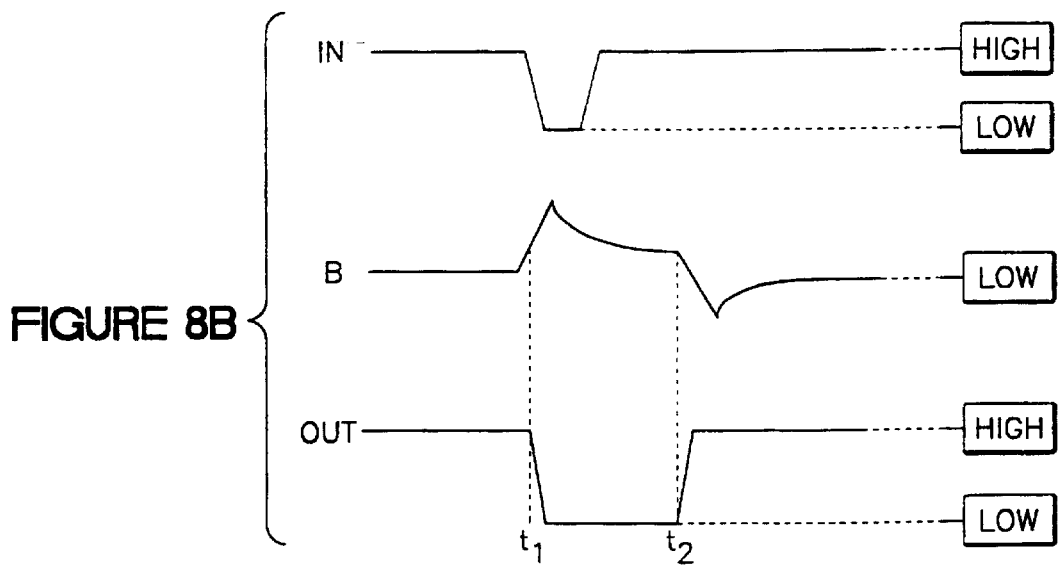
Figure 9:
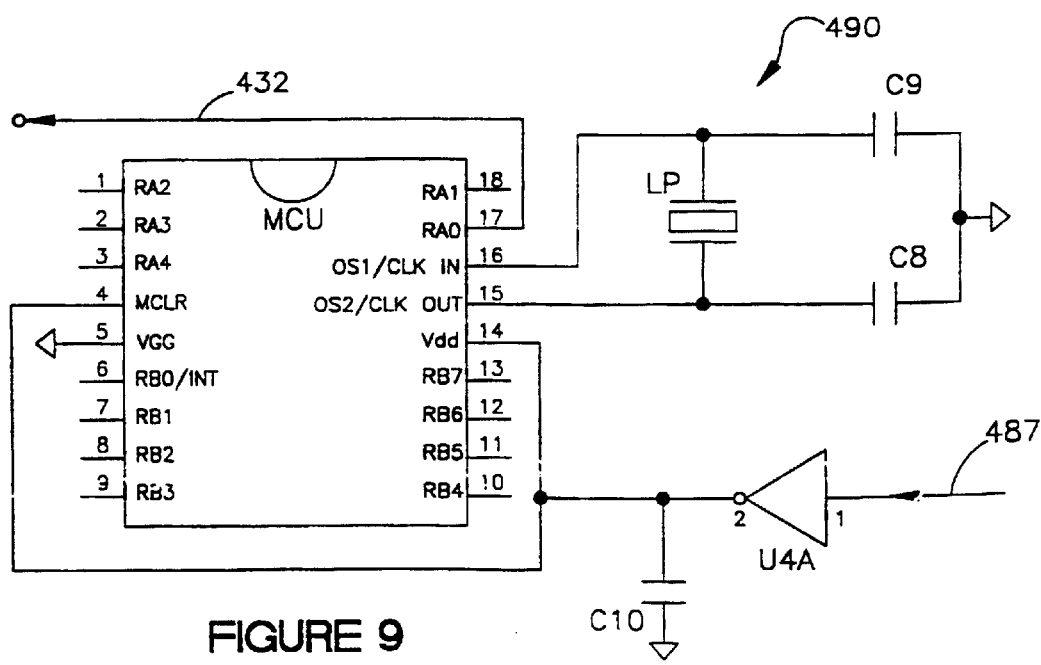
Figure 10:
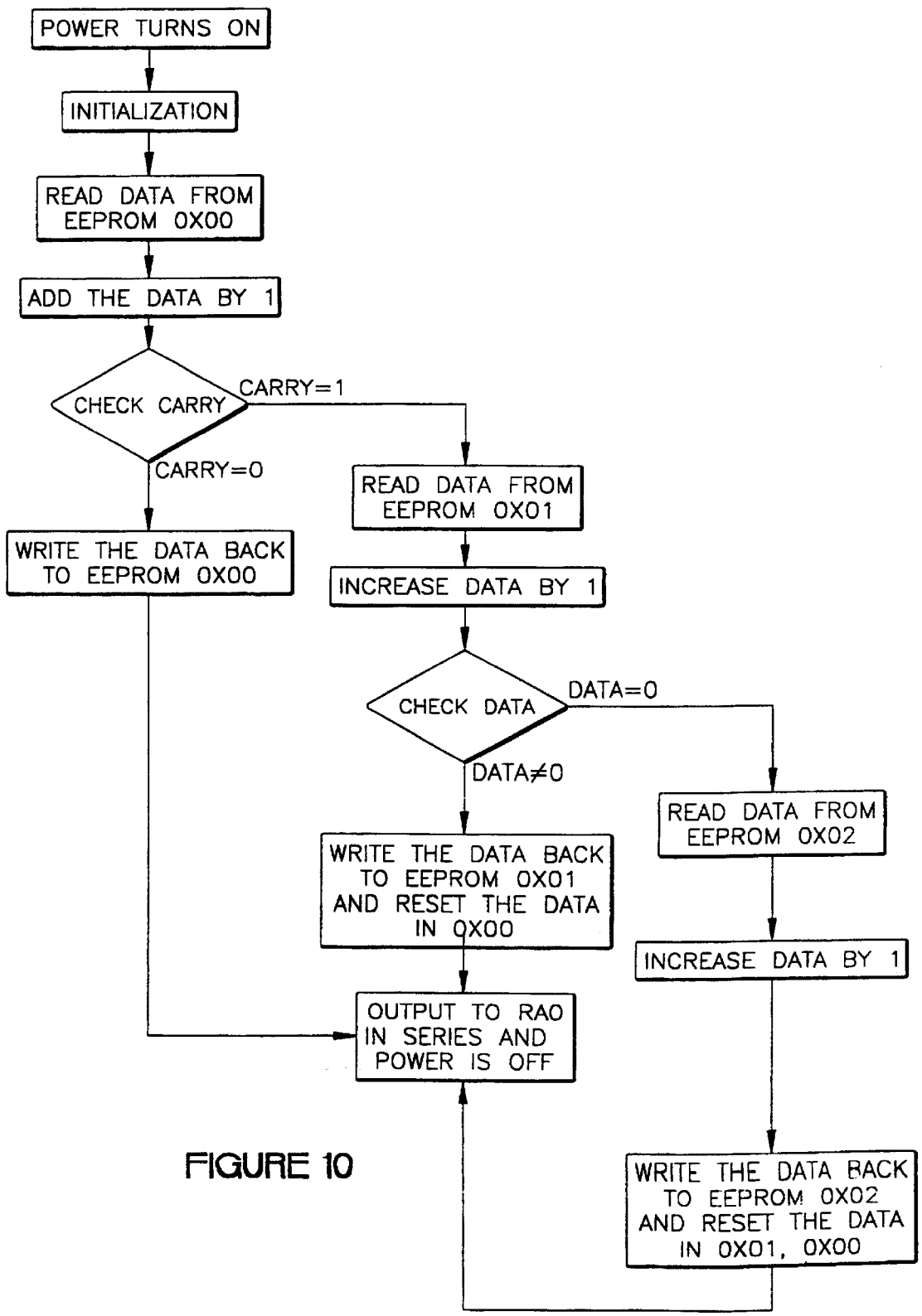

The structure, operation, and advantages of the present preferred embodiment of the invention will become further apparent upon consideration of the following description taken in conjunction with the accompanying drawings, wherein:

FIG. 1A is a simplified block diagram of a tire pressure monitoring system, according to the prior art;

FIG. 1B is a side plan view, partially sectioned, of a tire having a transponder mounted therein, according to the prior art;

FIG. 2A is a side, cross-sectional view of a bimporh piezo element, according to the prior art;

FIG. 2B is a side, cross-sectional view of a unimorph piezo element, according to the prior art;

FIG. 3A is a side plan view, partially sectioned, of a tire having a transponder, a piezo element, and a revolution counting circuit mounted therein, according to the invention;

FIG. 3B is a top plan view, partially cutaway, of a unimorph piezo element, according to the invention;

FIG. 4 is a block diagram of a self powered tire revolution counter, according to the invention;

FIG. 5 is a circuit diagram of a power supply circuit including a piezo element and the elements of the power circuitry, according to the invention;

FIG. 6A is a circuit diagram of a signal processing circuit, according to the invention;

FIG. 6B is a plot of the voltage transfer characteristic of an inverting Schmitt trigger, according to the invention;

FIG. 6C is a circuit diagram of an inverting Schmitt trigger, with plots of the input and output voltage waveforms, according to the invention;

FIG. 7 is a circuit diagram of a divided-by-50ripple counter, according to the invention;

FIG. 8A is a circuit diagram of a one shot circuit, according to the invention;

FIG. 8B is three plots of the voltage waveforms at nodes "IN", "B", and "OUT", respectively of the one shot circuit of FIG. 8A, according to the invention;

FIG. 9 is a circuit diagram of a microcontroller with its associated circuitry, according to the invention; and FIG. 10 is a flow chart for the program code of the microcontroller of FIG. 9, according to the invention.

DETAILED DESCRIPTION OF THE INVENTION

FIG. 3A illustrates a pneumatic tire 304 with the apparatus of this invention added to a transponder module 306 all suitably mounted to an inside surface 305 of the tire 304. An RF receiver (antenna) 310 is also shown external to the tire, such as could be mounted on a vehicle (not shown) utilizing the tire 304. The invention consists of a piezo element 340, electrically connected to a revolution counting circuit module 330 by one or more wires 342, and the revolution counting circuit module 330 is, in turn, connected to the transponder 306 by one or more wires 332. The piezo element 340 is suitably attached to or embedded within the inner wail of the tire, under the tread or the sidewall, in a way which causes it to flex with the tire each time the circumferential sector of the tire containing the piezo element 340 is compressed against the road or other vehicle-supporting surface. The transponder module 306 and revolution counting circuit module 330 could be separate modules, as shown, or could be fabricated together in a single module, and can be mounted in any fashion to any suitable part of the tire inner wall 305 as long as the electrical connection 342 is reliably maintained between the piezo element 340 and the revolution counting circuit module 330. It is also within the scope of this invention for the piezo element 340 and the revolution counting circuit module 330, to be combined (e.g., on a flexible circuit board, or a rubber patch containing both parts), and they in turn can be combined with the transponder module 306 if it is present. Although this preferred implementation of the invention includes interfacing the invention with a transponder module, it is also within the scope of the invention to simply count tire revolutions and store the result to be read at a later time (such as at tire end of life) by opening the tire 304 and electrically connecting the revolution counting circuit module 330 to a readout device (not shown) via wire(s) 332.

With the preferred implementation of the invention as shown in FIG. 3A, the tire 304 flexes the piezo element 340 every revolution enough to create an energy pulse in the revolution counting circuit module 330. The energy pulse is simultaneously used to power the revolution counting circuit module 330 and to provide a pulse to be counted. The revolution counting circuit module 330 adds one revolution to its internal count and stores the new count in non-volatile memory. The stored total is made available to external reading devices, such as the transponder module 306, via wire(s) 332. Finally, if present, the transponder module 306 can utilize the count for its own purposes and can transmit the count and any derived data to a receiver such as the receiver 310. Because the count is stored in nonvolatile memory, it is not affected by the lack of power during the majority of the time when the piezo element 340 is not being flexed and therefore is not providing circuit power. For the same reason, the invention does not require a battery, or any other external power source. In an enhanced version, still within the scope of the invention, the revolution counting circuit module 330 can divide the counted number of revolutions by an appropriate factor to convert the outputted count to an approximate number of miles traveled by the tire 304.

FIG. 4 illustrates a block diagram of a preferred embodiment 400 of the invention. This will be used as an outline for the detailed description to follow, and includes a cross-reference to related drawings. As in FIG. 3A, there are two main parts to the invention 400: a piezo element 440 (compare 340) which feeds both power and signal over wire(s) 442 (compare 332) to a (revolution counting) circuit module 430 (compare 330). An optional transponder 406 (compare 306, 106) is also shown, connected by wire(s) 432 (compare 332) to allow the transponder 406 to read a stored revolution/mileage count from the circuit module 430. The lines between blocks (elements) in the diagram have directional arrows to show the flow of power, signal, or data.

Inside the circuit module 430, the wire(s) 442 split into two paths: wire(s) 442" carry the power to a power circuitry element 450, which in turn supplies a stable DC voltage $V_{dd}$ to other module elements which need DC power to operate (active elements); wire(s) 442" carry the signal to the revolution counting circuit which comprises the remainder of the revolution counting module 430. The first element of the revolution counting circuit 460/470/480/490 is a signal processing element 460. The signal processing element 460 includes three stages for sequentially processing the input signal: a low pass filter 462, a limiter 464, and a Schmitt trigger 466. After signal processing, the signal is passed to a counter 470 via wire 467, then to a one shot 480 via wire 477, and finally to a micro-controller (MCU) with an integral non-volatile memory (EEPROM) 490 via wire 487.

It should be noted that, in order to operate without an external power supply (such as a battery) the invention is designed to operate only during the short time period each revolution of the tire when the piezo element 440 produces a burst of energy. This places several design constraints on the invention: The piezo element 440 must provide enough energy to power the circuit module 430, for a long enough time to allow the circuit module 430 to process the signal and convert it into an updated count stored in the nonvolatile memory of the MCU 490. Correspondingly, the various elements of the circuit module 430 must be designed to minimize their power requirements and also minimize the time required by the elements to complete their functions.

An additional design constraint is the need to minimize the size/weight of the components to allow them to be mounted to the inside of a pneumatic tire (e.g., 304) without negatively impacting the performance of the tire. It will be noted that the circuitry described herein for the embodiment of the circuit module 430 consists of a particular arrangement of discrete electronic components. It is within the scope of this invention to include any functionally similar arrangement of electronic components, whether discrete or built together in a custom integrated circuit or combination of integrated circuits.

The various elements of the invention will now be described, roughly in the order outlined by the blocks in FIG. 4.

THE PIEZOELECTRIC ELEMENT

Piezoelectric assemblies (piezo elements) are known and have been described in the background. As illustrated in FIGS. 2A and 2B, there are two basic forms for most piezo elements: the bimorph 200, and the unimorph 220. For the purposes of this invention, any form of piezo element could be utilized, as long as it meets the power, pulse length, and size/mountability constraints mentioned hereinabove. The piezoelectric crystal 204, 208, 224 used in the piezo element 200, 220 can be chosen from a wide variety commercially available; for the preferred embodiment described herein, Clevite PZT-5H was used because of its high piezoelectric coupling, enhanced permittivity and compliance, increased DC resistivity, and reduced aging rate.

FIG. 3B illustrates an embodiment of a unimorph (compare 220) type of piezo element which was developed for the preferred embodiment of this invention: a circular unimorph 340' (compare 340, 220). The circular unimorph 340' has two circular plates bonded together: the piezo crystal plate 324 is in the center with a diameter such as approximately 24 mm and a thickness such as approximately 0.18 mm. The support element 326 is preferably a brass plate which has a larger diameter, such as approximately 42 mm, with a suitable thickness, such as approximately 0.22 mm. A plastic ring 328 is optionally extended from the edge of the support element 326 for edge support. The top surface of the piezo crystal 324 is coated, preferably with silver, forming an electrode 322 to enable electrical connections such as one of the wires 342. The whole area of the piezo crystal 324 is under compressive stress if an external force is applied in the center. The stress distribution is more uniform than that of a bimorph (e.g., 200) implemented in a typical cantilever mounting. Making the piezo crystal plate 324 a smaller diameter than the support element 326 is advantageous because the stress changes its sign if the piezo crystal plate 324 covers the whole area of the support element 326. Preventing the stress from changing sign over the surface of the piezo crystal plate 324, prevents a stress cancellation effect and therefore maximizes the energy conversion efficiency for the circular unimorph 340' design.

The embodiment of the invention described herein has been optimized for an example pneumatic tire such as an 11R22.5 truck tire having a nominal outside diameter of 493 mm. For such a tire, it can be determined that the maximum bending angle where the round circumferential tire tread deforms to become flat in the footprint area is approximately 9.5°. Also, based on the nominal (unworn) tire diameter, the example tire will rotate approximately 501 revolutions per mile, at a rate (frequency) of 0.14 rev/sec (Hz) per mile-per-hour (MPH).

A piezo element (e.g., 340, 340') which is mounted in a tire (e.g., 304) is flexed and straightened whenever the tread sector closest to the piezo element 340 contacts the road (or other vehicle supporting surface). A positive pulse is generated when the piezo element 340 is flexed. When straightened again, a typical piezo element has been shown to produce a damped oscillating positive/negative signal at a significantly lower peak level than the positive pulse. The damped oscillations are determined by physical characteristics of the piezo element (mass, compliance) which are analogous to components of an LC circuit (inductance, capacitance). A typical measured oscillation frequency is on the order of 100 Hz. These oscillations are beneficial for energy conversion by the power circuitry 450, but are also major sources of electrical "noise" in the revolution counting signal which must be dealt with in the signal processor 460 of the circuit module 430, 330.

POWER CIRCUITRY

Nearly all electronic circuits require stable DC voltage. However, electric pulses generated by PZT are alternating signals. The power circuitry element 450 is required to convert ac signals to a stable DC power supply. FIG. 5 illustrates the power circuitry 450 in detail, showing three stages: a rectifier 452, a filter 454, and a regulator 456. The three stages of the power circuitry element 450 are shown being supplied a pulse of power from the piezo element 440.

RECTIFIER

A rectifier changes ac to DC by diodes because diodes are a one way conductor. Rectifiers are of two types, half-wave rectifier and full-wave rectifier. If only one diode is used, only positive half waves can be used. A full wave rectifier can utilize both positive and negative waves. A bridge rectifier is one type of the full wave rectifiers, whose efficiency of rectification is higher than that of half wave rectifier. Therefore, a bridge rectifier 452 is used in this invention.

FILTER

The rectified waveforms output from the rectifier stage 452 are DC (direct current) only in the sense that they don't change polarity. But they still have a lot of periodic variations with respect to the steady value. The variations are called ripples. Ripples have to be smoothed out in order to generate DC clean enough to reliably power the active circuitry of the circuit module 430. This is fulfilled by a π type low pass filter 454 shown in FIG. 5. Generally, the π type filter has reduced ripples and higher DC output than the simple RC network if the same resistance R value and same amount of capacitance C are used. The small resistor RO (e.g., 1 KΩ) is chosen to reduce the resistive loss. The capacitor C1 (e.g., 50 nf) is sized to match the piezo element 440 capacitance which may have capacitance values such as approximately 46 nf and 60 nf for a bimorph 200 and a unimorph 220, 340', respectively, so that the optimum power can be delivered from the piezo element 440. A large capacitor C2 (e.g., 220 μf) is used to store a large amount of electric energy.

In order to draw maximum power from the piezo element 440, the circuit module 430 "load" impedance has to match with the output impedance of the piezo element 440. The piezo element 440 output impedance is capacitive since the piezo element 440 is operated at or under its resonant frequency (Z=R+j(ωL−1/ωC)), so we should match it with an inductor. However, since the whole system is operated at very low frequency, the inductance needs to be more than 50 H to match the piezo element 440 output impedance. It is too bulky to use such a large inductor. Therefore, a capacitor is used instead.

It is known that the ripple level (peak-to-peak magnitude of rippling imposed on the nominal DC voltage level) increases with an increase in load current, and the ripple level decreases with increasing frequency or with increasing capacitance. Therefore, a large capacitor is better than a small capacitor to reduce ripple. A bridge rectifier 452 is also better than a half wave rectifier in ripple reduction because the ripple waveform frequency is doubled.

Frequently, the RMS ripple voltage $V_r$ is used to express the ripple level. It can be shown that the RMS value is related to the peak to peak ripple $V_{rpp}$ by:

$$V_r = \frac{V_{rpp}}{2\sqrt{3}}$$

A "ripple factor" r is defined as:

$$r = \frac{rms\ ripple\ voltage}{dc\ output\ voltage} = \frac{V_r}{V_{dc}}$$

where $V_{dc}$, represents the DC output level. For simplicity, the above equation applies to the π type filter although it is derived from a single capacitor filter. In the invention, the input waveforms vary with different conditions such as the deflection of the piezo element 440, the force applied, and the vibration of the piezo element 440 element. The DC levels also change with those conditions. A faster tire speed (revolution rate or frequency), a larger piezo deflection or a larger force will cause a higher DC level to be generated. For example, in a test of the embodiment of this invention, when the resistive load of the regulator stage 456 was 232 kΩ at a tire speed of 71 MPH (10 rev/s), the voltage across the load varied from 5.23 V to 5.35 V. The DC level is the average, 5.29 V, and the RMS ripple voltage is:

$$V_r = \frac{V_{rpp}}{2\sqrt{3}} = \frac{5.35 - 5.23\ (V)}{2\sqrt{3}} = 0.035\ V$$

The ripple factor r is then calculated as:

$$r = \frac{V_r}{V_{dc}} = \frac{0.035}{5.29} = 0.7\%$$

REGULATOR

The power supply circuits described hereinabove suffer from the fact that the DC output is not regulated. The input waveforms are noisy pulses generated by the piezo element 440, varying with the tire revolution frequency, the piezo element 440 deflection and the induced vibration/oscillation.

Although the filter 454 takes care of much of the ripple Introduced by the rectifier 452, these other voltage variations are still transferred to the DC output of the filter 454. Moreover, as the load on the filter 454 changes, added voltage variations occur. To improve the power-supply design a voltage regulator stage 456 is added to eliminate the remaining ripples and stabilize the output no matter what input conditions and output load are.

A typical regulator employs an op-amp and a pass transistor, dissipating considerable power. Since the piezo element 440 generates only microwatts of power, it is not enough to drive a typical regulator to function properly. Fortunately, the ripples after the filter are not significant (e.g., only 0.7% at a fixed revolution frequency), so a voltage reference can be used to stabilize the voltage output. For example, the LM185 is a 2.5 V IC band-gap voltage reference chosen for the preferred embodiment of this invention. The output capacitor C3 provides a small amount of capacitance (e.g., 0.1 μf) to work with the LM185 by suppressing switching noise. The LM185 quiescent current is only 10 μA, which is much less than the mA current needed for a zener diode voltage reference. The LM185 also has low noise and good long-term stability. With the use of the LM185, the output voltage $V_{dd}$ is regulated around 2.5 V even with the variations inherent in a source such as the described piezo element 440, 340 mounted in an operating tire 304.

The regulator 456 provides another function important to the design of the invention. The voltage generated by the piezo element 440 can build up to a very high level with increases of circuit load impedance and/or vehicle/tire speed. An open circuit voltage of 34 V was obtained with a large deflection for a tested cantilever-mounted bimorph piezo element 200. Most electronic circuits cannot stand such a high voltage, so regulation of the power circuitry 450 output voltage $V_{dd}$ is necessary to ensure that all the active circuit module elements 466, 470, 480, 490 receive a proper voltage. The LM185 is used to limit and regulate the power circuitry 450 output voltage $V_{dd}$ at approximately 2.5 V.

It should be noted that the LM185 in the regulator 456 consumes some power and influences the performance of the energy converter. Also, the power circuitry 450 cannot make Up for too low a voltage coming from the piezo element 440. In a test of the preferred embodiment, the tire speed was varied to test the of the power circuitry 450 versus tire speed for the tested truck tire. When the tire speed is lower than 45 MPH, neither the cantilever-mounted bimorph 200 or the circular unimorph 340' piezo elements could provide enough power to maintain a voltage output $V_{dd}$ of 2.5 V, although the circular unimorph 340' had a slightly higher power output. When the tire runs faster than 45 MPH, which is minimum speed for a truck to run on the highway, either piezo element can serve as a 2.5 V voltage source.

SIGNAL PROCESSING

The piezo element 440 generated revolution signal is mixed with oscillation waveforms and other vibrational noises. In order to shape the piezo element 440 pulse into a signal that can interface with the digital counting circuit 470, a low pass filter 462, a voltage limiter 464, and a Schmitt trigger 466 are used. FIG. 6A illustrates a schematic of the signal processing circuit (element) 460.

LOW PASS FILTER

The design of the low pass filter 462 is intended to remove high frequency oscillations (~100 Hz) so that only the revolution signals remain. A low pass filter can be used because the revolution rate for a typical tire would be on the order of 12.6 Hz even for operation at vehicle speeds of 90 MPH. The low pass filter 462 consists of three components, capacitor C4 (e.g., approximately 100 nf), resistor R2 (e.g., approximately 1.2 MΩ) and capacitor C5 (e.g., approximately 10 nf), which establish a resistive π type low pass filter. The π type has a slightly greater DC output than a simple RC filter, and with a considerably smaller high frequency AC ripple voltage because it increases AC divider action. The π type filter makes the waveform smoother compared to a simple RC filter.

A simplified circuit for the piezo element 440 can be seen as a capacitor and a small resistor Rp in series with a voltage generator. In a test embodiment, the value of Rp was measured to be 300 Ω. Using the effective resistance Rp for the piezo element 440, the time constant τ of the resistive π type low pass filter 462 is:

$$\tau = (R_p C_4 + R_p C_5 + R_2 C_5)$$

which calculates to:

$$\tau = (0.3\ k\Omega \cdot 100\ nf + 0.3\ k\Omega \cdot 10\ nf + 1200\ k\Omega \cdot 10\ nf) = 0.012\ rad/sec$$

We can see that the time constant is mainly dependent on resistance R2 and capacitance C5. The cutoff frequency of the low pass filter is $f_r = 1/(2\pi\tau) = 13.1$ Hz. For the test tire of the preferred embodiment, a revolution frequency of 13.1 Hz represents a vehicle speed of 93 MPH, well above the expected usage in a truck tire. Of course the resistance and capacitance values used in the filter 462 would be adjusted to provide an upper limit cutoff frequency $f_r$ appropriate for the intended application of the invention. The filter's cutoff frequency should be only slightly higher than the maximum expected revolution frequency of the application tire 304. There are some information losses in the filtered analog revolution signal. However, it is absolutely tolerable in thins specific application since the revolution signal will be transformed into rectangular waveform. For this purpose, a slowly varying signal with a pulse shape is enough. On the other hand, the ripples with large amplitude or spikes are most harmful to the system since they tend to be counted as revolutions by the circuit. Fortunately, spikes and ripples occur at a higher frequency than the baseline revolution signal, so to reduce the spikes and the ripples, the cutoff frequency $f_r$ is designed as low as possible. After the filter 462, the revolution signal still remains but with most of the spikes and ripples removed. The smoothed revolution signal next goes to a limiter stage 464 and a Schmitt trigger stage 466 to be digitized.

LIMITER

Some time-varying signals have a range of magnitudes that are predictable, but signal sources like the piezo element 440 produce varying magnitude signals with occasional peaks or bursts outside the desired operating range. Electronic circuits, especially microchip devices, are vulnerable to excessive signal levels and may accidentally be damaged if safe levels are exceeded. Therefore, a limiter circuit is needed to limit the signal to an allowable range.

In the limiter stage 464, the limiting circuitry is combined with a "DC restorer circuit." A DC restorer circuit consists of a capacitor in series with a diode, such as capacitor C6 (e.g., approximately 10 nf) with diode D1 (e.g., d1n914) or capacitor C6 with diode D2 (e.g., d1n914). Capacitor C6 with diode D1 shifts the signal level downward, and capacitor C6 with diode D2 (reverse biased from diode D1) shifts the signal level upward. The combination of the two. capacitor/diode pairs results in a circuit capable of limiting both positive and negative signal voltage levels close to around a zero level. The resistor R3 (e.g., approximately 670 kΩ) is used to limit the current. Thus the limiter stage 464 limits both the signal current and voltage to reasonable levels for the remainder of the revolution counting circuitry (elements 466, 470, 480, and 490). With the example component values chosen for the preferred embodiment of the limiter stage 464, the unpredictable input signal is "clamped" within a range of plus 0.6 V to minus 0.6 V.

SCHMITT TRIGGER

A Schmitt trigger (e.g., 466) is a device with two important properties: Firstly, it responds to a slowly changing input waveform with a fast transition time at its output. Secondly, the voltage-transfer characteristic of the device displays different switching thresholds for positive and negative going input signals. FIG. 6B shows the typical voltage-transfer characteristic of a Schmitt trigger. The upper threshold point and lower threshold point are represented by $V_{M+}$ and $V_{M-}$, respectively. The hysteresis voltage is defined as the difference between the two.

The smoothed revolution signal input to the Schmitt trigger stage 466 from the limiter stage 464 is a slowly varying noisy signal, clamped between –0.6 V and +0.6 V by the limiters of the limiter stage 464. In order to interface with a digital counting circuit such as the counter 470, the signal must be a rectangular waveform with a full-swing amplitude. As shown in FIG. 6C, an op amp U4 (e.g., MAX406) and resistors R4 (e.g., approximately 2.2 MΩ) and R5 (e.g., approximately 33 kΩ) establish a Schmitt trigger which outputs a signal transformed as desired from the input signal. The effect of the positive feedback resistor R4 is to give the circuit two thresholds, dependent upon the output state. As illustrated in the graph of FIG. 6B, the threshold $V_{M-}$ is around zero volts when the output $V_{Out}$ is at ground (0 V). The threshold $V_{M+}$ when the output is high is calculated by:

$$V_{M+} = \frac{R_5}{R_4 + R_5} \times V_{dd} = \frac{33k}{33k + 2.2M} * 2.5\ V = 37\ mV$$

If the amplitude of the input signal increases and becomes larger than $V_{M+}$ (37 mV), the output is quickly switched to around due to the positive feedback. Then as the input waveform reaches its peak positive level and moves in the negative direction, it reaches $V_{M-}$ (around 0 mV) where the output switches to its positive output level. The piezo element 440 generated pulses are narrow. Due to the inverting effect of this Schmitt trigger 466, the digitized waveform has a duty cycle more than 50%. After one more inverter, the digitized pulse will have a duty cycle less than 50%. The rectangular wave can be recognized by digital circuits directly, therefore the output of the Schmitt trigger stage 466 can be fed to the digital counting circuit (counter) 470.

In order to design a power efficient Schmitt trigger 466, a large value for resistor R4 and an ultra-low power consumption op-amp U3 are chosen for the preferred embodiment of the invention. The MAX406 used for op amp U3 features a supply current of less than 1.2 $\mu A$.

COUNTER

For the example 11R22.5 truck tire 304, every mile raveled corresponds to approximately 501 revolutions of the tire 304. Given the long useful life of truck tires, which may be re-treaded many times, the total tire revolutions can become a very large number. It becomes expedient to scale down the number stored in the revolution counting memory by creating a divided-by-$F_s$ counter for the counter element 470. The number $F_s$ a scaling factor which can be used to reduce the value of the total count. In the preferred embodiment of this invention, the total count is scaled down 501:1 (scaling factor $F_s$=501), which conveniently makes the saved revolution count an approximation of the total miles traveled by the tire 304. So for the example preferred embodiment of the invention, a divided-by-501 counter 470 is created. Since the revolutions per mile is determined by the tire diameter (circumference), the scaling factor $F_s$ would have to be different for each tire diameter in order for the count to still represent mileage. If such a custom mileage counter is desired, then it will be seen that appropriate wire connections in the counter 470 circuit could be made selectable by means of jumpers or microswitches rather than by hard wiring as shown in the preferred embodiment. These alternative connection means should be considered within the scope of this invention.

The basic components for most digital counters are flip-flops. By different means of connecting together the flip-flops, two kinds of counters can be formed: synchronous and asynchronous counters. The former clocks all flip-flops simultaneously, whereas in the latter the output of each flip-flop feeds the next, causing the frequency at each output to be half that of the preceding one. Since a synchronous counter has all its flip-flop stages clocked at the same time, it can get rid of the pitfalls which are associated with a ripple counter, but it pays the price with more elements and more power consumption. A ripple counter is simple, easy to construct and consumes little power, which is adequate for the application of this invention.

A divided-by-501 (factor $F_s$=501) counter circuit 470 is shown in FIG. 7. The digitized pulse signal from the Schmitt trigger stage 466 output is input on wire 467 to terminal 1 of op amp U3A (e.g., 74HC04) which outputs to the CLK terminal of a ripple counter U4 (e.g., 74HC4040) which is appropriately connected to input terminals of the NAND gate U5 (e.g., 74HC133). The output of the NAND gate U5 proceeds via wire 477 to the next revolution counting circuit element, the one shot 480. This output signal is also looped back through an inverter (op amp) U30 (e.g., 74HC04) to the CLR terminal of the ripple counter U4.

In the preferred embodiment, a 12 stage ripple counter 74HC4040 is used for the ripple counter U4, which consists of 12 master-slave flip-flops. The largest number it can reach is $2^{12}$=4095. This number will not be used to count total revolution, but rather it will be used to count up to the scaling factor $f_s$. The counter circuit 470 must be reset to start again from 0, and to advance a pulse to the next stage every $f_s$ revolutions of the tire to represent miles instead of revolutions. In this example embodiment the scaling factor $f_s$=501 revolutions for 1 mile. The ripple counter U4 maximum count of 4095 is more than adequate to handle the scaling factor $f_s$ of any likely tire application since an $f_s$ of 4095 would be appropriate for a tire with an outside diameter of only 60 mm.

The decimal number 501 can be written in the format: 501 =$2^8+2^7+2^6+2^5+2^4+2^2+2^0$, which can be represented by the 12 bit binary number: 0001,1111,0101. A bit value of "1" is created by connecting the appropriate output bit of ripple counter U4 to the corresponding input bit of the NAND gate U5. A bit value of "0" is created by leaving the appropriate output bit of the ripple counter U4 unconnected but connecting the corresponding input bit of the NAND gate U5 to supply voltage Vdd. As shown in FIG. 7, the least significant output bit for the example ripple counter U4 (74HC4040) is QA terminal 9, and the corresponding least significant input bit for the NAND gate U5 (74HC133) is terminal 2. The output and input bits can be seen to be connected properly for the scaling factor of $f_s$=501 (binary number 0001,1111, 0101).

The output of the NAND gate U5 is normally HIGH. Because of the specific interconnections between ripple counter U4 and NAND gate U5 and voltage $V_{dd}$, when the number 0001,1111,0101 (only this number) appears on the outputs of ripple counter U4, it is decoded by the NAND gate U5 as a logical TRUE which passes through the NAND gate U5 producing a LOW output on wire 477. The negative transition of the NAND gate U5 output feeds the inverter U30 to provide a reset signal to the CLR terminal of the ripple counter U4, thereby zeroing out its output bits. Thus the number 0001,1111,0101 is not present for very long and then the output of the NAND gate U5 transitions back from LOW to its normal HIGH value as the ripple counter U4 continues counting up but from the reset value of 0000, 0000,0000. Thus the example counter 470 will output a narrow negative pulse on wire 477 to the next stage (one shot 480) of the revolution counting circuit every 501 revolutions (one mile).

ONE SHOT

The signal from the counting circuit 470 is a very short pulse, which is not enough to trigger and drive the microcontroller (MCU) 490, where the scaled revolution count total should be stored in non-volatile memory (EEPROM). To make the microcontroller work properly and have enough time to process and store the data, the microcontroller needs to be kept on for a period of time, which can be programmed by a monostable vibrator circuit, also known as a "one shot" 480.

FIG. 8A illustrates the one shot circuit 480. The short digital signal output from the counting circuit 470 is input on the wire 477 to one of the input terminals of a two-input NAND gate U6A (e.g., 74HC00). The input voltage level can be measured at the node labeled "IN". The NAND gate U6A output signal is at a node labeled "A" and passes through a resistor-capacitor (RC) network comprised of capacitor C7 (e.g., 0.1 $\mu f$) and resistor R6 (e.g., 10 M$\Omega$) which is tied to ground. The node labeled "B" is on the output side of the RC network and becomes the input to an op amp U3E (e.g., 74HC04) used as an inverter. The output of the op amp U3E is labeled node "OUT" and provides both a feedback signal to the other one of the input terminals of the two-input NAND gate U6A, and also an outgoing signal to the MCU 490 via wire 487.

A monostable vibrator circuit such as one shot 480 is a circuit that generates a pulse of a predetermined width every time the quiescent circuit is triggered by a pulse. It is called monostable because it has only one stable state (the quiescent one). A trigger event, which is either a signal transition or a pulse, causes the circuit to go temporarily into another quasi-stable state. This means that it eventually returns to its original state after a time period determined by the circuit parameters. This circuit, also called a one-shot, is useful in generating pulses of a known time period. The pulse length is a function of the time constant of an associated RC network and also on the threshold voltage of the constituent IC chips.

The monostable (one shot) circuit 480 uses positive feedback combined with an RC timing network to produce an output pulse of a fixed width, once triggered by a narrow input pulse. FIG. 8B illustrates the voltage waveforms and their temporal relationships for the signals at the nodes IN, B and OUT. In the normal quiescent state (outside of the $t_1$–$t_2$ time interval), node B is held low by the resistor R6, so node OUT is high (after the inverter). Node A is low, since both of the NAND gate U6A inputs (IN and OUT) are high. The capacitor C7 is discharged, allowing both nodes A and B to be low. Starting at a time just before $t_1$, node IN begins to go low, driven by the narrow inverted signal pulse from the output of the counting circuit 470. Driving one of the two inputs to the NAND gate low causes the output at node A to go high. Due to the capacitive coupling through capacitor C7 node B follows, also going high (temporarily), and this causes node OUT to go low after the inverter U3E. Assuming that the gate delays are negligible (or smaller than the width of the input pulse), node OUT reaches the low level before the input signal returns to its normal high level.

The situation at this point is not a stable one. The voltage at node B starts to fall because the resistor R6 pulls down the node with a time constant of PC. At time $t_2$, the voltage at B reaches the switching threshold of the inverting op amp U3E, which toggles. Node OUT therefore goes high, matching the high state of node IN causing the NAND gate U6A to switch node A to low again. The capacitive coupling results in an overshoot at node B that gradually disappears at which point the circuit reverts to the stable quiescent state. The width of the output pulse $t_d$ is determined primarily by the time constant RC and the switching threshold $V_M$ of the inverter U3E. We can derive an analytical expression for the output pulse width $t_d$ by evaluating the voltage waveform at node B during the transition:

$$V_B(t) = V_{dd}\left(1 - e^{-\frac{t-t_1}{R_6 C_7}}\right)$$

Taking into account that $V_B(t=t_2)=V_M$ yields:

$$t_d = t_1 - t_2 = R_6 C_7 \times \ln\left(\frac{V_{dd}}{V_{dd} - V_M}\right)$$

For $V_M=V_{dd}/2$, R6=10 MΩ, and C7=0.1 µf, we can get:

$td=0.69 R_6 C_7=690$ msec

Thus the pulse width for this embodiment of the one shot 480 is calculated to be 690 msec, which is long enough for the microcontroller 490 to operate properly. The pulse width is a function of the threshold voltage $V_M$, which is relatively sensitive to spreads in the production process, so $V_M$ is not necessarily exactly equal to Vdd/2. Therefore, the pulse width varys around 690 msec. In tests by the inventor, the pulse width was found to be about 600 msec, which still meets the minimum time requirement for the microcontroller 490 to function properly.

MICROCONTROLLER MCU WITH EEPROM

In order to process the data from the counting circuit, it is necessary to employ a microcontroller MCU to deal with the sequential operations. A microcontroller is a highly integrated arithmetic processing unit, which performs a series of instructions, normally as codes programmed in a ROM, EPROM, or EEPROM non-volatile memory. By changing the program codes in them, the personality of the system can be radically altered. Normally, a microcontroller holds its data in one or more registers, which are portions of Random Access Memory (RAM). Unlike ROM memory, RAM memory is volatile, i.e., any data in RAM is lost whenever the power source of a microcontroller is disconnected. Since the revolution counting circuitry 460/470/480/490 of this invention must function with the periodic power supplied by the piezo element, a conventional microcontroller is not adequate. It would lose the counted data every time the power is interrupted. It is necessary to employ a non-volatile memory to prevent data loss. The PIC16F84 microcontrollers by Microchip Technology Inc. is utilized in the preferred embodiment of this invention because it can fulfil both necessary functions: (1) processing the sequential operations, and (2) storing the total count (data) in non-volatile memory. The second function is fulfilled by a built-in EEPROM. EEPROM stands for Electrically Erasable Programmable ROM. It can be programmed by applying an electric field and retains its stored bit pattern when the power is removed. The data stored in EEPROM can last up to 40 years.

The PIC16F84 is a CMOS, fully static, 8-bit microcontroller. It employs an advanced RISC architecture with a total of 35 instructions. The separate instructions and data buses of the Harvard architecture allow a 14-bit wide instruction word with a separate 8-bit wide data bus. It can operate from DC to a 10 MHz clock rate. PIC16F84 contains 1 k—words of Flash program memory, 68 bytes of RAM, 64 bytes of Data EEPROM memory, and 13 I/O pins. The PIC16F84 has a wide operating voltage range, from 2 V–6 V. To achieve the goal of low power consumption, the PIC16F84 can operate at 32 kHz with an LP oscillator at which it only consumes 15 µA at 2 V. In addition, PIC16F84 has a feature that it can operate in sleep mode and only consume 1 µA standby current.

Power consumption of the PIC16F84 is dependent upon the oscillator frequency which it uses. The device must operate fast enough to interface with external circuitry and perform its counting program during the limited pulse of power, yet slow enough to conserve power. The PIC16F84 can be operated at four different oscillator configurations, (1) Low Power Crystal (LP), (2) Crystal/Resonator (XT), (3) High Speed Crystal/Resonator (HS) and (4) Resistor/Capacitor (RC). In XT, LP or HS configurations a crystal or ceramic resonator is connected between the OSC1/CLKIN and OSC2/CLKOUT pins to establish oscillation. For timing insensitive applications the slow RC device option offers additional cost savings.

FIG. 9 illustrates the preferred embodiment of the MCU with EEPROM element 490 of the invention. The microcontroller MCU has an oscillator circuit consisting of crystal LP and two capacitors C8 and C9. The periodic signal from the counter 470 and one shot 480 is input on wire 487 to an op amp U4A (e.g., 74HC04) which serves as a buffer and inverter (to provide positive voltage power pulses) followed by a capacitor C10. The wire 432 is connected to one of the microcontroller MCU output pins to provide a serial readout of the count value which is stored in the EEPROM of the microcontroller MCU.

An LP oscillator running at 32.768 kHz is suitable for the invention. With this LP oscillator, the microcontroller MCU only consumes 15µA at 2 V for program code execution. The low power crystal LP is, for example, an EPSON C-001R32.768 K-A. The capacitors C8, C9 (e.g., approximately 15 pf each) are connected to the crystal LP to complete an oscillating circuit. Increasing the capacitance of the capacitors C8 and C9 will increase the stability of the oscillator, but the start-up time would also increase, thereby consuming more power. To further decrease power consumption, the microcontroller MCU is placed in a "sleep mode" whenever possible, because in this mode it consumes less than 1 µA at 2 V. Finally, connecting the pin $\overline{MCLR}$ to pin $V_{dd}$ also helps to reduce the power consumption.

The microcontroller MCU is run using an external event method to minimize power demand. To accomplish this, the counting signal from the one shot element 480 is used as the power source for the microcontroller MCU, by connecting the input signal to the $V_{dd}$ input power pin of the microcontroller MCU. This does not stress the circuit elements since any I/O pin of the chosen inverter op amps can source or sink up to 20mA current, and since the PIC16F84 microcontroller MCU draws only 15 µA current to execute program code and 2 mA peak current for EEPROM read/write operations. With this connection, the peripheral circuitry for the microcontroller MCU is simplified dramatically, thereby providing less power-consuming components in the circuit. In addition, capacitor C10 (e.g., 10 µf) is connected to the Vdd pin to act as a power reservoir, further stabilizing the power supply for the microcontroller MCU.

In general, the MCU with EEPROM circuit 490 functions as follows: The output of the one shot circuit 480 is provided to the buffering inverter op amp U4A with capacitor C10 to increase its driving capability (signal strength). The output of the buffering converter is connected to the power input pin $V_{dd}$ of the microcontroller MCU. Effectively, every time the counter 470 is reset (indicating a set of $f_s$ revolution counts, which is preferably one mile) the microcontroller will be turned on with a power pulse which will last up to approximately 600 msec). The microcontroller MCU is programmed to first read data from the EEPROM, then increase the count, then write the new (updated) count back to the EEPROM, and also to an I/O pin in the format of binary serial code, which can be read via the interface wire 432 by an external device such as the optional transponder 406, which could in turn transmit the count to an external reader by RF telemetry. In order to save power, the microcontroller MCU is switched to sleep mode, immediately after completing the writing steps, and will turn off completely when the input signal/power pulse ends (returns to zero voltage). Even without power, the data will remain in the non-volatile EEPROM. As an additional way to minimize power consumption, all unused I/O pins are configured as outputs and reset low in the software. This ensures that switching currents will not occur due to a floating input. Also, the power-up timer is turned off to eliminate its power consumption.

FIG. 10 shows the flowchart of a preferred program for the microcontroller MCU. When the microcontroller MCU is turned on, it will initialize the device configuration and clear up the data memory. The revolution data is read from EEPROM, increased by 1, and then written back to the EEPROM. Afterwards, the data in EEPROM is read again and sent to one of the I/O pins. And then the microcontroller is switched to sleep mode while waiting for the one shot circuit 480 to switch the power off.

The data storage area in the EEPROM has 24 bits, so the largest binary number which can be stored is $2_{24}-1=16,777,215$. If the revolution data is saved into EEPROM once every mile, this microcontroller MCU could record more than 16 million miles. However, the EEPROM can stand typically 1 million cycles of EEPROM ERASE/WRITE operations, thereby limiting the record to at most 1 million miles. This is still twice the 500,000 miles which is estimated to be the maximum useful life of a re-treaded truck tire.

TEST RESULTS

Every element of the self powered revolution counter 400 of the invention has been discussed in the preceding sections, with reference to electronic component values and other parameter choices made for the preferred embodiment of the invention. The circuitry and system of the preferred embodiment has been tested and functions very well. The tests show that the electrically noisy pulses generated by the piezo element 440 are mingled with some resonant frequencies, which are all filtered by the low pass filter stage 462 in the signal processing element. The filter 462 is connected with a voltage limiter stage 464 and the revolution signals are clamped within −0.6 V to +0.6 V. The Schmitt trigger stage 466 is then used to change the relatively noisy, slowly changing input to a clean square wave pulse train, which feeds the 12-stage binary ripple counter 470. After the number in the counter 470 reaches the scaling factor of 501, (i.e. 1 mile for the truck tire tested), the counter 470 triggers the one-shot circuit 480. The one-shot circuit then generates a pulse adequate to turn on the power for the microcontroller 490 for approximately 600 msec. The microcontroller 490 (with a built-in EEFROM) is thereby triggered and also powered to run the steps of its program: read the previously stored count in EEPROM, increase the count by 1, and then write the updated count back to EEPROM. Since the EERPOM can retain the data even with the power off, the revolutions can be accumulated continuously even with an interrupted power. The count in EEPROM is also sent to one of the I/O pins in series mode as an output. Finally the microcontroller 490 goes into a power-conserving sleep mode until it is switched off when the pulse is finished and the one-shot circuit returns to its stable state.

The power source for the revolution counting circuitry 460/470/480/490 is provided by the piezo element 440 as a mechanical-electrical energy converter in conjunction with the power conditioning circuitry 450, so that no battery is needed. The circuitry of the invention has been designed to minimize its power demands. Power in CMOS circuits is mainly consumed during the switching activities of the gates. The static power dissipation of most CMOS type components is limited to leakage, less than 1 µA. The dynamic power consumption of an inverter is expressed as:

$P_{dyn}=C_L V^2_{dd} f$

This equation holds for more complex gates as well since the nature of the energy consumption remains the identical:

charging and discharging capacitors. Minimizing power consumption then depends on several factors. The $V_{dd}$ factor is, obviously, the most influential due to quadratic dependence. Therefor the most effect way to achieve low power design is to reduce the voltage source. All the logic components are from 74 HC CMOS series, which can operate at 2 V with less than 1 $\mu$A quiescent current. The op amp MAX406 needs 2.5 V voltage source suggested by the datasheets, but it can work as low as at 1.5 V based on the experiment results. The microcontroller PIC16F84 operates from 2 V to 6 V. Therefore, the voltage source $V_{dd}$ is chosen as 2.5 V.

Another factor is the physical capacitance. There is nothing we can do to change the capacitance parameters inside chips, but we can reduce the external capacitance outside of chips in the circuit. By employing small capacitors, small power is consumed.

The operating frequency of the circuit depends on the vehicle/tire speed. The slower it runs, the smaller the power it consumes, but with smaller generated power. Finally, in the analog circuit, increase the resistance to limit the current is another important way to reduce the power consumption.

The power circuitry 450 consumes power as well because a regulator is used to stabilize the voltage output. It dissipates 2.5×10=25 $\mu$W. The microcontroller 490 consumes the most power of the circuit when it functions. Before it is on, the whole circuit consumes only about 2.5 $\mu$A at 2.5 Volts with a 10 Hz input, corresponding to a truck speed of 71 MPH. When the microcontroller 490 is on, the microcontroller not only executes the program code, which consumes only 15 $\mu$A, but also operates the EEPROM read/write, which consumes current in the order of milliamps. Fortunately, the microcontroller 490 only needs a short time at high current to write the data into EEPROM. The microcontroller 490 is powered for 600 msec, but only. 300 msec is required to execute the program code and EEPROM read/write operations. The RMS current of the circuit is about 277 $\mu$A. Therefore, when the truck runs as 71 MPH the power consumption can be calculated by:

$$Preg = 2.5\ V * 10\ \mu A = 25\ \mu W$$

$$Pckt = 2.5V * (2.5\ \mu A + 277\ mA * 300\ ms/50\ s) = 10\ \mu W$$

$$Ptotal = Preg + Pckt = 25\ \mu W + 10\ \mu W = 35\ \mu W.$$

The power consumption for this revolution counter is about 35 $\mu$W when truck runs at 71 MPH. The tests show that both the unimorph and bimorph piezo element 440 energy converters can provide more than 60 $\mu$W even when the truck runs at 50 MPH. With higher speeds, even more power is generated. Therefore, the revolution counting system can function well with the piezo element 440 energy converters.

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Piezoelectric-powered tire revolution counter, comprising:

a piezoelectric element attached to or embedded within a wall of a pneumatic tire in a manner to be subjected to periodic mechanical stresses as the tire rotates, thereby generating energy pulses;

power circuitry connected to the piezoelectric element for receiving the energy pulses, having an output for supplying a DC voltage ($V_{dd}$) to power circuitry of the revolution counter; and a revolution counting circuit connected to the piezoelectric element for receiving the energy pulses;

wherein:

the piezoelectric element is in the form of a circular unimorph.

2. Piezoelectric-powered tire revolution counter, according to claim 1, wherein:

the piezoelectric element circular unimorph comprises a piezoelectric crystal formed as a circular plate; a support element formed as a circular plate and bonded to a first side of the piezoelectric crystal; and an electrode coated on a second side of the piezoelectric crystal, characterized in that:

the support element is a brass plate which has a larger diameter than the piezoelectric crystal.

3. Piezoelectric-powered tire revolution counter, according to claim 2, characterized in that:

the piezoelectric crystal is approximately 24 mm in diameter and 0. 18 mm in thickness, and is mounted concentrically to the support element which is approximately 42 mm in diameter and 0.22 mm in thickness.

4. Piezoelectric-powered tire revolution counter, according to claim 2, characterized in that:

the piezoelectric crystal is composed of lead zirconate-titanate (Pb(Zrl-xTix)03).

5. Piezoelectric-powered tire revolution counter, according to claim 1, wherein the revolution counting circuit is characterized by:

a signal processing circuit element for processing a signal comprising the energy pulses generated by the piezoelectric element, having a low pass filter for attenuating high frequency signal noise in the energy pulses; a voltage limiter comprising forward and backward biased diodes for limiting voltage and current in the energy pulses; and a Schmitt trigger receiving an output of the forward and backward biased diodes, for converting the energy pulse signal with relatively irregular shape to a clean square wave signal for interfacing with the revolution counting circuit;

a digital logic circuit for counting;

a monostable vibrator circuit element to expand on-time in the square wave signal; and a microcontroller circuit element with non-volatile data storage for updating a revolution count in its non-volatile data storage, and for making the revolution count available to an optional external reading device.

6. Piezoelectric-powered tire revolution counter, according to claim 1, characterized in that:

the piezoelectric element is attached to, or embedded within, an inner wall of the pneumatic tire under a tread portion of the pneumatic tire.

* * * * *